US006180721B1

(12) United States Patent
Rogestedt et al.

(10) Patent No.: US 6,180,721 B1
(45) Date of Patent: Jan. 30, 2001

(54) INSULATING COMPOSITION FOR COMMUNICATION CABLES

(75) Inventors: Laila Rogestedt, Ödsmål; Hans-Bertil Martinsson, Varekil; Lars Thorn, Kungälv; Ruth Dammert, Västra Frölunda, all of (SE)

(73) Assignee: Borealis Polymers Oy, Porvoo (FI)

( * ) Notice: Under 35 U.S.C. 154(b), the term of this patent shall be extended for 0 days.

(21) Appl. No.: 09/261,830

(22) Filed: Mar. 3, 1999

(30) Foreign Application Priority Data

Jun. 12, 1998 (SE) ........................................ 9802087

(51) Int. Cl.[7] ............................ H01B 7/18; H01B 9/02; C08L 23/00; C08L 23/04

(52) U.S. Cl. ......................... 525/191; 525/240; 29/828; 174/102 R; 174/105 R; 174/110 R; 174/110 SR; 174/110 B; 174/110 PM

(58) Field of Search ................................ 525/191, 240; 29/828; 174/102 R, 105 R, 110 R, 110.5 R, 110 B, 110 PM

(56) References Cited

U.S. PATENT DOCUMENTS

| | | |
|---|---|---|
| 3,646,155 | 2/1972 | Scott . |
| 3,749,629 | 7/1973 | Andrews et al. . |
| 4,117,195 | 9/1978 | Swarbrick et al. . |
| 4,286,023 | 8/1981 | Ongchin . |
| 4,297,310 | 10/1981 | Akutsu et al. . |
| 4,351,876 | 9/1982 | Doi et al. . |
| 4,397,981 | 8/1983 | Doi et al. . |
| 4,413,066 | 11/1983 | Isaka et al. . |
| 4,446,283 | 5/1984 | Doi et al. . |
| 4,456,704 | 6/1984 | Fukumara et al. . |
| 4,547,551 | 10/1985 | Bailey et al. . |
| 4,576,993 | 3/1986 | Tamplin et al. . |
| 4,795,482 | 1/1989 | Gioffre et al. . |
| 4,812,505 | 3/1989 | Topcik . |
| 4,970,278 | 11/1990 | Komabashiri et al. . |
| 5,047,468 | 9/1991 | Lee et al. . |
| 5,149,738 | 9/1992 | Lee et al. . |
| 5,380,803 | 1/1995 | Coutant et al. . |
| 5,382,631 | 1/1995 | Stehling et al. . |
| 5,453,322 | 9/1995 | Keogh et al. . |
| 5,521,264 | 5/1996 | Mehra et al. . |
| 5,574,816 | 11/1996 | Yang et al. . |
| 5,580,493 | 12/1996 | Chu et al. . |
| 5,582,923 | 12/1996 | Kale et al. . |
| 5,718,974 | 2/1998 | Kmiec . |
| 5,719,218 | 2/1998 | Sarma . |
| 5,731,082 | 3/1998 | Gross et al. . |
| 5,736,258 * | 4/1998 | Moy ..................................... 428/523 |
| 5,798,427 | 8/1998 | Foster et al. . |
| 5,807,635 | 9/1998 | Cogen et al. . |
| 5,891,979 | 4/1999 | Dammert et al. . |

FOREIGN PATENT DOCUMENTS

| | | |
|---|---|---|
| 0 040 992 | 5/1984 | (EP) . |
| 0 041 796 | 8/1984 | (EP) . |
| 0 207 627 A2 | 1/1987 | (EP) . |
| 0 207 627 A3 | 1/1987 | (EP) . |
| 0 022 376 | 3/1987 | (EP) . |
| 0 214 099 A2 | 3/1987 | (EP) . |
| 0 237 294 | 9/1987 | (EP) . |
| 0 318 841 | 6/1989 | (EP) . |
| 0 334 993 A2 | 10/1989 | (EP) . |
| 0 348 978 A2 | 1/1990 | (EP) . |
| 0 369 436 A2 | 5/1990 | (EP) . |
| 0 193 317 B1 | 9/1990 | (EP) . |
| 0 401 540 A2 | 12/1990 | (EP) . |
| 0 460 936 A1 | 12/1991 | (EP) . |
| 0 475 064 A1 | 3/1992 | (EP) . |
| 0 497 530 A2 | 8/1992 | (EP) . |
| 0 533 160 | 3/1993 | (EP) . |
| 0 535 230 A1 | 4/1993 | (EP) . |
| 0 538 033 A1 | 4/1993 | (EP) . |
| 0 540 075 A1 | 5/1993 | (EP) . |
| 0 420 271 B1 | 12/1994 | (EP) . |
| 0 517 868 | 11/1995 | (EP) . |
| 0 688 794 | 12/1995 | (EP) . |
| 0 750 319 A1 | 12/1996 | (EP) . |
| 980788 | 4/1998 | (FI) . |
| 942369 | 11/1963 | (GB) . |
| 2 028 831 | 3/1980 | (GB) . |
| 63-279503 | 11/1988 | (JP) . |
| 4-353509 | 12/1992 | (JP) . |
| WO 91/09075 | 6/1991 | (WO) . |
| WO 92/12182 | 7/1992 | (WO) . |
| WO 92/13029 | 8/1992 | (WO) . |
| WO 95/10548 | 4/1995 | (WO) . |
| WO 9703124 | 1/1997 | (WO) . |

OTHER PUBLICATIONS

Mikko Saikkonin, "Extrusion of slotted core elements", Wire Technology International, Nov. 1995.
Williams et al., Polymer Letters, vol. 6, pp. 621–624 (1968).
JP 2–235740 abstract. Jujo Paper Co Ltd, Sep. 18, 1990, abstract, figure 1. Japan, vol. 14, No. 552, M–1056.

(List continued on next page.)

*Primary Examiner*—Nathan M. Nutter
(74) *Attorney, Agent, or Firm*—Merchant & Gould P.C.

(57) ABSTRACT

An insulating composition for communication cables (2) is disclosed as well as a telesingle wire (2) which comprises the insulating composition and a telecommunication cable (1) which comprises a plurality of telesingle wires (2) including the insulating composition. The insulating composition comprises a multimodal olefin polymer mixture, obtained by polymerization of at least one α-olefin in more than one stage having a density of about 0.920–0.965 g/cm$^3$, a melt flow rate ($MFR_2$) of about 0.2–5 g/10 min, an $FRR_{21/2} \geqq 60$, and an environmental stress cracking resistance (ESCR) according to ASTM D 1693 A/10% Igepal, of at least 500 hrs, said olefin polymer mixture comprising at least a first and a second olefin polymer, of which the first is selected from (a) a low molecular weight (MW) olefin polymer with a density of about 0.925–0.975 g/cm$^3$ and a melt flow rate ($MFR_2$) of about 300–20 000 g/10 min, and (b) a high molecular weight (MW) olefin polymer with a density of about 0.880–0.950 g/cm$^3$ and a melt flow rate ($MFR_{21}$) of about 0.5–20 g/10 min.

13 Claims, 1 Drawing Sheet

OTHER PUBLICATIONS

JP 06340036 A abstract. Goyo PaperWorking Co Ltd, Dec. 13, 1994, Japan, vol. 94, No. 12.
JP 01100803 A2 abstract. STN International, File CAPLUS, CAPLUS accession No. 1989:555983, Doc. No. 111:155983, Hitachi Cable, Ltd.: "Hindered amine–containing crosslinked polyethylene electric insulators for cables and wires": Apr. 19, 1989.
JP 56065667 A abstract. Jun. 3, 1981.
International Search Report for PCT/SE94/00073 dated Mar. 14, 1995.
International Search Report for PCT/SE94/01028 dated Mar. 14, 1995.
International Search Report for PCT/SE96/00900 dated Oct. 14, 1996.
International Search Report for PCT/SE97/01197 dated Oct. 28, 1997.
International Search Report for PCT/SE98/00013 dated May 5, 1998.
International Search Report for PCT/SE98/01786 dated Feb. 2, 1999.
International Search Report for PCT/SE98/01894 dated Feb. 2, 1999.
International Search Report (revised) for PCT/SE98/01894 dated May 4, 1999.
International Search Report for PCT/SE98/01949 dated Feb. 24, 1999.
International–Type Search Report for search request No. SE98/00591 dated Jan. 29, 1999.

* cited by examiner

INSULATING COMPOSITION FOR COMMUNICATION CABLES

FIELD OF THE INVENTION

The present invention relates to an insulating composition for communication cables which have insulated copper conductors and are used for data, video or voice transmission. More particularly, the present invention relates to an insulating composition for data transmission wires of communication cables such as telesingle wires and coaxial cables.

BACKGROUND OF THE INVENTION

Telecommunication cables are often comprised of a plurality of telesingle wires surrounded by a sheath. The number of telesingle wires may vary from a few in a data transmission cable up to about one thousand in a telephone cable. The sheath surrounding the bundle of telesingle wires consists of at least one layer and may consist of two layers, an inner sheath layer and an outer sheath layer. In order to further protect and isolate the telesingle wires a filler such as petroleum jelly may in e.g. telephone cables be inserted in the voids between the telesingle wires and the sheath. Each telesingle wire normally consists of one solid 0.4–0.5 mm thick copper conductor surrounded by a 0.15–0.25 mm thick insulating layer. The overall thickness of a telesingle wire is thus only about 0.7–1.0 mm.

Another type of data transmission cable, is the so-called coaxial cable, where a central copper conductor, typically from 0.5 up to 2 mm thick, is surrounded by an insulating layer up to 2 mm thick, and then by a coaxial metallic screen which in turn is surrounded by an outer sheath.

The insulating composition of the present invention is intended as the insulating layer of telesingle wires as well as of coaxial cables, but for the sake of simplicity the invention will be explained and illustrated with reference to telesingle wires only. Generally, the properties required of a coaxial cable are substantially the same as those of a telesingle wire.

The insulating layer surrounding each telesingle conductor normally comprises a medium to high density polyethylene composition. The insulating layer may be solid, foamed, or a combination thereof such as foamed with an outer skin or foamed with both an inner and an outer skin. The foam is prepared by introducing a gas such as nitrogen, carbon dioxide, or a solid blowing agent such as e.g. azodicarbonamide (dec. temp. about 200° C.) into the polymer composition. The skin/foam structure is prepared by coextruding the polymer composition in two or three layers and foaming one of the coextruded layers.

Particularly important characteristics of the insulating layer of a telesingle wire are good processability, high thermo-oxidative stability, high environmental stress cracking resistance (ESCR), and good surface finish. The importance of good processability is illustrated by the fact that the copper conductor is coated with the insulating layer in a thickness of only 0.15–0.25 mm at a coating speed of up to about 2500 m/min. In addition the coating must be very even and any exposure of the copper conductor must be avoided because of the risk of short circuiting, overhearing and other signal disturbances. An uneven thickness of the insulating layer also leads to capacitance variations. Further, the telesingle wires of a telecommunication cable are often exposed to very severe temperature conditions and in hot countries the telesingle wires may be exposed to temperatures as high as about 70–90° C. In order to achieve a good thermal resistance various stabilizers lika thermooxidation stabilizers and metal deactivators are normally added to the insulating composition, but such stabilisers are expensive and it would be desirable if the use thereof could be reduced or eliminated. Further still, the fillers such as petroleum jelly and the copper conductor often have a deleterious influence on the insulation, particularly when the telesingle wire is exposed to high temperatures. In order to withstand this deleterious influence the insulating composition should have a high ESCR. Finally, the surface finish of the insulating layer must be high in order to avoid formation of dust when twisting the telesingle wires.

From the above it is evident that the insulating layer of telesingle wires is exposed to a number of very disparate conditions and strains and should display a combination of very specific and to a certain extent contradictory characteristics, particularly with regard to processability, thermo-oxidative stability, and ESCR. An improvement in one or more of these characteristics and a reduction of the amount of stabilisers added would be very desirable and represent an important technical advance.

In this connection it should be mentioned that a bimodal cable-sheathing composition is known through WO 97/03124. This cable-sheathing composition consists of a multimodal olefin polymer mixture, obtained by polymerisation of at least one α-olefin in more than one stage and having a density of about 0.915–0.955 g/cm$^3$ and a melt flow rate of about 0.1–3.0 g/10 min, said olefin polymer mixture comprising at least a first and a second olefin polymer, of which the first has a density and a melt flow rate selected from (a) about 0.930–0.975 g/cm$^3$ and about 50–2000 g/10 min and (b) about 0.88–0.93 g/cm$^3$ and about 0.01–0.8 g/10 min. It should be stressed that this composition is not an insulating composition for telesingle wires, but a cable-sheathing composition, i.e. a composition for the outer sheathing of a cable, e.g. the sheathing surrounding a bundle of telesingle wires as mentioned previously. The properties required of a cable-sheathing composition are not the same as those of an insulating composition for a telesingle wire. Thus, high mechanical strength and low shrinkage are particularly important to a cable-sheathing, while processability and surface finish are less critical. On the contrary, thermo-oxidative stability, ESCR, and in particular processability are of decisive importance to the insulation of a telesingle wire. These different requirements in properties of a cable-sheathing versus an insulation for a telesingle wire means that a composition optimized for a cable-sheathing would not be useful as an insulation for a telesingle wire and vice versa.

SUMMARY OF THE INVENTION

It has now been found that the above goals may be achieved by a communication cable such as a telesingle wire or a coaxial cable with an insulating layer which, instead of a unimodal polyethylene plastic as used in conventional insulating layers of telesingle wires, comprises a multimodal olefin polymer mixture having certain specified values of the molecular weight distribution and the environmental stress cracking resistance (ESCR) together with certain specified values of density and melt flow rate, both as regards the polymer mixture and as regards the polymer fractions forming part thereof.

The present invention thus provides an insulating composition for communication cables such as telesingle wires and coaxial cables, characterised in that it comprises a multimodal olefin polymer mixture, obtained by polymerisation of at least one α-olefin in more than one stage, having a density of about 0.920–0.965 g/cm$^3$, a melt flow rate ($MFR_2$) of about 0.2–5 g/10 min, an $FRR_{21/2} \geqq 60$, and an environmental stress cracking resistance (ESCR) according to ASTM D 1693 A/10% Igepal, of at least 500 hrs, said olefin polymer mixture comprising at least a first and a second olefin polymer, of which the first is selected from (a) a low molecular weight (MW) olefin polymer with a density of about 0.925–0.975 g/cm$^3$ and a melt flow rate ($MFR_2$) of about 300–20 000 g/10 min, and (b) a high molecular weight (MW) olefin polymer with a density of about 0.880–0.950 g/cm$^3$ and a melt flow rate ($MFR_{21}$) of about 0.5–20 g/10 min.

By the "modality" of a polymer is meant the structure of the molecular-weight distribution of the polymer, i.e. the appearance of the curve indicating the number of molecules as a function of the molecular weight. If the curve exhibits one maximum, the polymer is referred to as "unimodal", whereas if the curve exhibits a very broad maximum or two or more maxima and the polymer consists of two or more fractions, the polymer is referred to as "bimodal", "multimodal" etc. In the following, all polymers whose molecular-weight-distribution curve is very broad or has more than one maximum are jointly referred to as "multimodal".

The invention further provides a telesingle wire comprising a conductor surrounded by an insulation, characterised in that the insulation comprises a composition according to any one of claims 1–10.

Still further the invention provides a telecommunication cable comprising a plurality of telesingle wires each comprising a conductor surrounded by an insulation, said plurality of telesingle wires in turn being surrounded by a sheath, characterised in that the insulation of the telesingle conductors comprises a composition according to any one of claims 1–10.

Further distinctive features and advantages of the invention will appear from the following description and the appended claims.

DETAILED DESCRIPTION OF THE INVENTION

In order to facilitate the understanding of the invention a detailed description will be given below with reference to the drawings.

BRIEF DESCRIPTION OF THE DRAWINGS

As mentioned above, one aspect of the invention relates to a telecommunication cable and a cross-section of a telecommunication cable is shown in FIG. 1. The telecommunication cable 1 comprises a plurality of telesingle wires 2, surrounded by a two-layered sheath consisting of an inner sheath 4 and an outer sheath 5. The voids between the telesingle wires and the sheath are filled with a filler 6 such as a petroleum jelly. For the sake of simplicity FIG. 1 shows a cable with only a few telesingle wires, but in practice the number of telesingle wires can be much higher and up to about one thousand in a cable.

FIG. 2*a*–2*d* schematically show different types of telesingle wires. Generally, a telesingle wire consists of a metallic conductor 7, usually a solid copper wire with a diameter of 0.4–0.5 mm. The metallic conductor is surrounded by an insulation 8 which may be solid (FIG. 2*a*), foamed (FIG. 2*b*), foamed with an outer skin (FIG. 2*c*), or foamed with both an outer skin and an inner skin (FIG. 2*d*). The insulation 8 has a thickness of 0.15–0.25 mm and it should be noted that for the sake of illustration the thickness of the insulation 8 has been exaggerated in FIG. 2.

Figure 1:
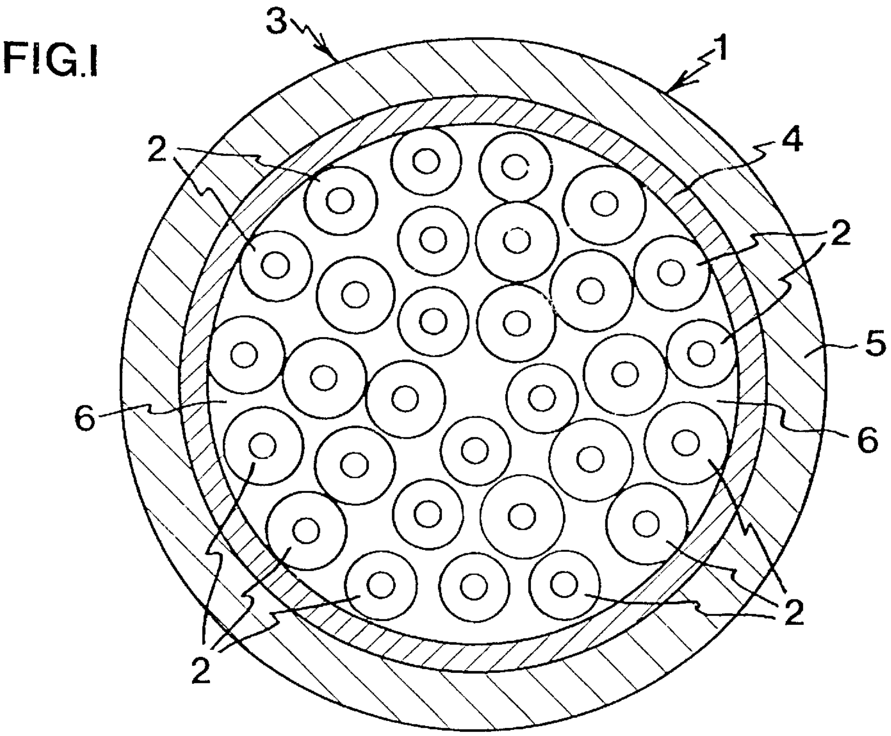
FIG. 1 shows a schematic cross-section of a telecommunication cable with telesingle wires.
Figure 2A:
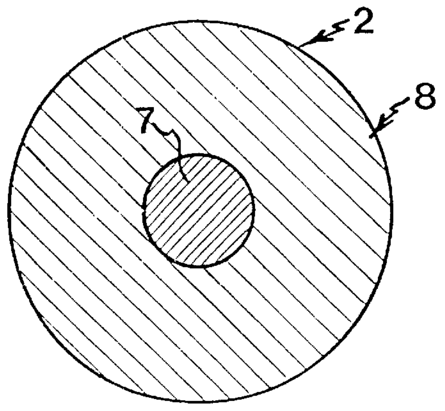
FIGS. 2*a–d* show schematic cross-sections of different types of telesingle wires.
Figure 2B:
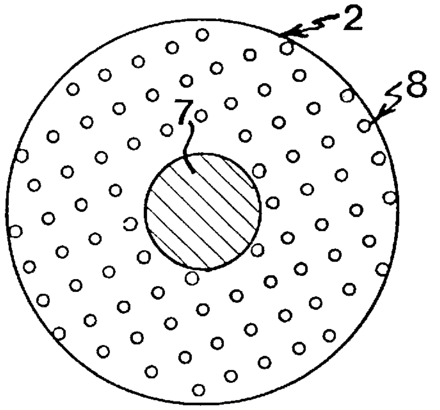
Figure 2C:
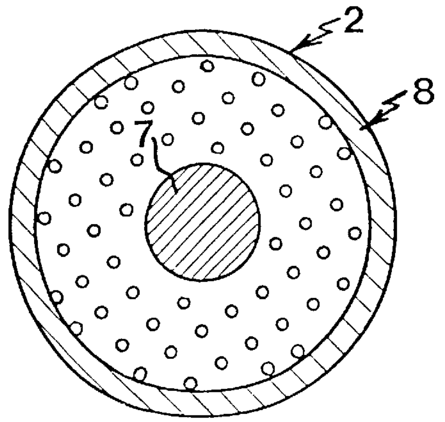
Figure 2D:
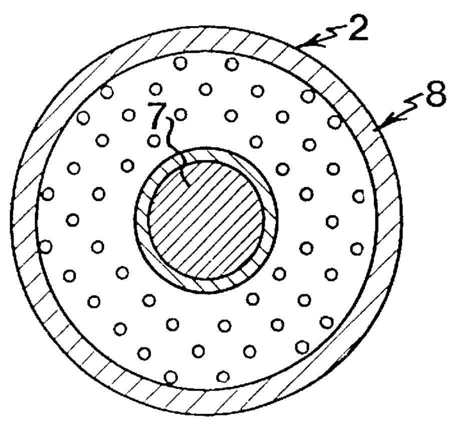

As indicated in the foregoing, the telesingle insulating composition according to the invention is distinguished by the fact that it comprises a multimodal olefin polymer mixture of specified density and melt flow rate together with certain specified values of the molecular weight distribution and the ESCR. More particularly, the molecular weight distribution, measured as $FRR_{21/2}$, of the composition according to the invention is at least 60, preferably 70–100, and the ESCR of the composition of the invention is at least 500 hrs, preferably at least 2000 hrs, measured according to ASTM D 1693 A/10% Igepal as explained in more detail below. In addition the insulating composition may include various stabilizers, such as antioxidants, metal deactivators, etc., in amounts required by the particular application.

It is previously known to produce multimodal, in particular bimodal, olefin polymers, preferably multimodal ethylene plastics, in two or more reactors connected in series. As instances of this prior art, mention may be made of EP 040 992, EP 041 796, EP 022 376 and WO 92/12182, which are hereby incorporated by way of reference as regards the production of multimodal polymers. According to these references, each and every one of the polymerisation stages can be carried out in liquid phase, slurry or gas phase.

According to the present invention, the main polymerisation stages are preferably carried out as a combination of slurry polymerisation/gas-phase polymerisation or gas-phase polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition of improved properties, a flexible method is required. For this reason, it is preferred that the composition is produced in two main polymerisation stages in a combination of loop reactor/gas-phase reactor or gas-phase reactor/gas-phase reactor. It is especially preferred that the composition is produced in two main polymerisation stages, in which case the first stage is performed as slurry polymerisation in a loop reactor and the second stage is performed as gas-phase polymerisation in a gas-phase reactor. Optionally, the main polymerisation stages may be preceded by a prepolymerisation, in which case up to 20% by weight, preferably 1–10% by weight, of the total amount of polymers is produced. Generally, this technique results in a multimodal polymer mixture through polymerisation with the aid of a chromium, metallocene or Ziegler-Natta catalyst in several successive polymerisation reactors. In the production of, say, a bimodal ethylene plastic, which according to the invention is the preferred polymer, a first ethylene polymer is produced in a first reactor under certain conditions with respect to monomer composition, hydrogen-gas pressure, temperature, pressure, and so forth. After the polymerisation in the first reactor, the reaction mixture including the polymer produced is fed to a second reactor, where further polymerisation takes place under other conditions. Usually, a first polymer of high melt flow rate (low molecular weight) and with a moderate or small addition of comonomer, or no such addition at all, is produced in the first reactor, whereas a second polymer of low melt flow rate (high molecular weight) and with a greater addition of comonomer is produced in the second reactor. As comonomer, use is commonly made of other olefins having up to 12 carbon atoms, such as α-olefins having 3–12 carbon atoms, e.g. propene, butene, 4-methyl-1-pentene, hexene, octene, decene, etc., in the copolymerisation of ethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, polymers, preferably ethylene polymers, and the production thereof belong to the prior art, no detailed description is called for here, but reference is had to the above specifications.

It should be pointed out that, in the production of two or more polymer components in a corresponding number of reactors connected in series, it is only in the case of the component produced in the first reactor stage and in the case of the end product that the melt flow rate, the density and the other properties can be measured directly on the material removed. The corresponding properties of the polymer components produced in reactor stages following the first stage can only be indirectly determined on the basis of the corresponding values of the materials introduced into and discharged from the respective reactor stages.

Even though multimodal polymers and their production are known per se, it is not, however, previously known to use such multimodal polymer mixtures in telesingle insulating compositions. Above all, it is not previously known to use in this context multimodal polymer mixtures having the specific values of density, melt flow rate, molecular weight distribution and ESCR as are required in the present invention.

As hinted at above, it is preferred that the multimodal olefin polymer mixture in the cable-sheathing composition according to the invention is a bimodal polymer mixture. It is also preferred that this bimodal polymer mixture has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor, a gas-phase reactor/a gas-phase reactor or a loop reactor/a loop reactor as the polymerisation of one, two or more olefin monomers, the different polymerisation stages having varying comonomer contents. Preferably, the polymerisation conditions in the preferred two-stage method are so chosen that a comparatively low-molecular polymer having a moderate, low or, which is preferred, no content of comonomer is produced in one stage, e.g. the first stage, owing to a high content of chain-transfer agent (hydrogen gas), whereas a high-molecular polymer having a higher content of comonomer is produced in another stage, e.g. the second stage. The order of these stages may, however, equally well be reversed.

Preferably, the multimodal olefin polymer mixture in accordance with the invention is a mixture of propylene plastics or, which is most preferred, ethylene plastics. The comonomer or comonomers in the present invention are chosen from the group consisting of α-olefins having up to 12 carbon atoms, which in the case of ethylene plastic means that the comonomer or comonomers are chosen from α-olefins having 3–12 carbon atoms. Especially preferred comonomers are butene, 4-methyl-1-pentene, 1-hexene and 1-octene.

By the term "ethylene plastic" is meant a plastic based on polyethylene or on copolymers of ethylene, the ethylene monomer making up most of the mass.

By the term "propylene plastic" is meant a plastic based on polypropylene or on copolymers of propylene, the propylene monomer making up most of the mass.

In view of the above, a preferred ethylene-plastic mixture according to the invention consists of a low-molecular ethylene homopolymer mixed with a high-molecular copolymer of ethylene and butene, 4-methyl-1-pentene, 1-hexene or 1-octene.

The properties of the individual polymers in the olefin polymer mixture according to the invention should be so chosen that the final olefin polymer mixture has a density of about 0.920–0.965 g/cm$^3$, preferably about 0.925–0.955 g/cm$^3$, and a melt flow rate, $MFR_2$, of about 0.2–5.0 g/10 min, preferably about 0.5–2.0 g/10 min. According to the invention, this may be achieved by the olefin polymer mixture comprising a first olefin polymer having a density of about 0.925–0.975 g/cm$^3$, preferably about 0.935–0.975 g/cm$^3$, and a melt flow rate of about 300–20000 g/10 min, preferably about 300–2000 g/10 min, and most preferred about 300–1500 g/10 min, and at least a second olefin polymer having such a density and such a melt flow rate that the olefin polymer mixture obtains the density and the melt flow rate indicated above.

If the multimodal olefin polymer mixture is bimodal, i.e. is a mixture of two olefin polymers (a first olefin polymer and a second olefin polymer), the first olefin polymer being produced in the first reactor and having the density and the melt flow rate indicated above, the density and the melt flow rate of the second olefin polymer, which is produced in the second reactor stage, may, as indicated in the foregoing, be indirectly determined on the basis of the values of the materials supplied to and discharged from the second reactor stage.

In the event that the olefin polymer mixture and the first olefin polymer have the above values of density and melt flow rate, a calculation indicates that the second olefin polymer produced in the second stage should have a density in the order of about 0.880–0.950 g/cm$^3$, preferably 0.910–0.950 g/cm$^3$, and a melt flow rate ($MFR_{21}$) in the order of about 0.5–20 g/10 min, preferably about 0.7–10 g/10 min.

As indicated in the foregoing, the order of the stages may be reversed, which would mean that, if the final olefin polymer mixture has a density of about 0.920–0.965 g/cm$^3$, preferably about 0.925–0.955 g/cm$^3$, and a melt flow rate of about 0.2–5.0 g/10 min, preferably about 0.5–2.0 g/10 min, and the first olefin polymer produced in the first stage has a density of about 0.880–0.950 g/cm$^3$, preferably about 0.910–0.950 g/cm$^3$, and a melt flow rate ($MFR_{21}$) of 0.5–20 g/10 min, preferably about 0.7–10 g/10 min, then the second olefin polymer produced in the second stage of a two-stage method should, according to calculations as above, have a density in the order of about 0.925–0.975 g/cm$^3$, preferably about 0.935–0.975 g/cm$^3$, and a melt flow rate of 300–20000 g/10 min, preferably about 300–2000 g/10 min, and most preferred about 300–1500 g/10 min.

In order to optimise the properties of the telesingle insulating composition according to the invention, the individual polymers in the olefin polymer mixture should be present in such a weight ratio that the aimed-at properties contributed by the individual polymers are also achieved in the final olefin polymer mixture. As a result, the individual polymers should not be present in such small amounts, such as about 10% by weight or below, that they do not affect the properties of the olefin polymer mixture. To be more specific, it is preferred that the amount of olefin polymer having a high melt flow rate (low-molecular weight) makes up at least 25% by weight but no more than 75% by weight of the total polymer, preferably 35–55% by weight of the total polymer, thereby to optimise the properties of the end product.

Preferably, the properties of the first and second polymers of the composition according to the invention are chosen so that the first and second polymers comprise a low molecular weight polymer and a high molecular weight polymer, respectively, the low molecular weight polymer having a density that is equal to or higher than, more preferably at most 0.05 $g/cm^3$ higher than that of the high molecular weight polymer.

As mentioned earlier, processability, thermo-oxidative stability, and ESCR are particularly important properties of the insulating composition of the invention.

The processability is defined herein in terms of the extruder speed in rpm at a given output in kg/h. It is always an advantage if the extruder screw speed in rpm at a given output is as low as possible (the extruder used in the examples is a single screw one of type Nokia-Maillefer with an L/D ratio of 24/1 and diameter 60 mm, run at 240° C. and covering an 0.5 mm thick solid copper wire at a line speed of 510 m/min with an insulating composition in the form of an 0.24 mm thick insulation at the given output of 16 kg/h). For a satisfactory processability it is further important that the extruded telesingle insulation has an even thickness. This property is measured in terms of the diameter variation or capacitance variation of the telesingle wire and/or the pressure variation of the extruder during a production run of the telesingle wire. These variations should be as small as possible and the diameter/capacitance variations should be at most about 3%, preferably at most about 2%, most preferably at most about 1%, while the pressure variation of the extruder should be at most about 2%, preferably at most about 1%, most preferably $\leqq 0.5\%$.

The thermo-oxidative stability is measured by means of a DSC-instrument in terms of Oxygen Induction Time (OIT) in minutes in an aluminium cup at 200° C. at an $O_2$ throughput of 80 ml/min. All samples compared have the same content of additives.

The Environmental Stress Cracking Resistance (ESCR), i.e. the resistance of the polymer to crack formation under the action of mechanical stress and a reagent in the form of a surfactant, is determined in accordance with ASTM D 1693 A, the reagent employed being 10% Igepal CO-630. The results are indicated as the percentage of cracked sample rods after a given time in hours. F20 means e.g. that 20% of the sample rods were cracked after the time indicated. The present invention requires an ESCR of at least 500 hrs, preferably at least 2000 hrs, i.e. 0/500, preferably 0/2000.

The "melt flow rate" (MFR) is determined in accordance with ISO 1133 and is equivalent to the term "melt index" previously used. The melt flow rate, which is indicated in g/10 min, is an indication of the flowability, and hence the processability, of the polymer. The higher the melt flow rate, the lower the viscosity of the polymer. The melt flow rate is determined at 190° C. and at different loadings such as 2,1 kg ($MFR_2$; ISO 1133, condition D) or 21 kg ($MFR_{21}$; ISO 1133, condition G). The flow rate ratio is the ratio between $MFR_{21}$ and $MFR_2$ and is represented as $FRR_{21/2}$. The flow rate ratio $FRR_{21/2}$ which is indicative of the molecular weight distribution of the composition is at least 60, preferably 70–100 at the present invention.

To further facilitate the understanding of the invention some illustrating, non-limiting examples are given below.

EXAMPLE 1

In a polymerisation plant consisting of two gas-phase reactors connected in series and using a Ziegler-Natta catalyst, two different bimodal ethylene plastics were polymerised (below referred to as Polymer A and Polymer B, respectively). The polymerisations were carried out so that the high molecular weight polymer fraction was produced in the first reactor (R1) and the low molecular weight polymer fraction was produced in the second reactor (R2). As a reference a conventional unimodal ethylene plastic (Ref.) for telesingle wire insulation was used.

Material data such as melt flow, density, thermo-oxidative stability and ESCR were determined for Polymer A, B and Ref. The results are given in Table 1.

TABLE 1

| | Polymer A | Polymer B | Ref. |
|---|---|---|---|
| $MFR_2$, final polymer (g/10 min) | 0.54 | 0.95 | 0.72 |
| Density, final polymer ($g/cm^3$) | 0.946 | 0.945 | 0.946 |
| $FRR_{21/2}$, final polymer | 62 | 68 | 86 |
| $MFR_{21}$, R1* (g/10 min) | 5 | 5 | — |
| Density, R1* ($g/cm^3$) | 0.926 | 0.921 | — |
| % R1** | 65 | 55 | |
| ESCR | >2000 h | >2000 h | F20 = 109 h |
| OIT (min) | 161 | 142 | 92 |

*value of polymer from the first reactor

**percentage of polymer from the first reactor based on the final polymer (also called "split")

From the results in Table 1 it is evident that the telesingle insulating composition of the invention (Polymer A and B) has a greatly improved environmental stress crack resistance as well as thermo-oxidative resistance.

EXAMPLE 2

The processabilities of the polymers in Example 1 (Polymer A, B and Ref.) were determined as described earlier by measuring the extruder speed (in rpm), the pressure variation of the extruder, and the diameter variation of the produced telesingle wire. The telesingle wire had a solid 0.5 mm copper conductor and the outer diameter of the telesingle wire was 0.98 mm. The line speed was 510 m/min and the temperature 240° C. The results are shown in Table 2.

TABLE 2

| | Polymer A | Polymer B | Ref. |
|---|---|---|---|
| Extruder speed, rpm (output 1 kg/min) | 19.5 | 19.1 | 23.7 |
| Pressure variation, % | ±0.2 | ±0.2 | ±0.9 |
| Diameter variation, % | ±0.0 | ±0.0 | ±2 |

From the results in Table 2 it is evident that the telesingle wire insulation of the invention has an about 20% improved processability with regard to the extruder speed, that the pressure variation is considerably less, and that the diameter variation is outstanding compared to the unimodal reference composition. The absence of diameter variations is an important improvement and means that the telesingle wire will not exhibit any undesired capacitance variations due to uneven insulation.

EXAMPLE 3

The mechanical properties of Polymer B in Example 1 and the Reference polymer (Ref.) of Example 1 were measured on dumbbells according to ISO 527-2, 1993/5A. The dumbbells were compression moulded from pellets of the materials in question. The dumbbells were aged in an oven, according to IEC 811-1-2, at 115° C. for different periods of time. The results are shown in Table 3.

TABLE 3

| | Unaged | Aged 2 months | Aged 4 months | Aged 6 months |
|---|---|---|---|---|
| Tensile strength at break (MPa) | | | | |
| Polymer B | 33.4 | 27.9 | 30.7 | 33 |
| Ref. | 14 | 16.4 | 17.4 | 16.2 |
| Elongation at break (%) | | | | |
| Polymer B | 1100 | 841 | 951 | 854 |
| Ref. | 456 | 729 | 710 | 483 |
| OIT (min) | | | | |
| Polymer B | 152 | 138 | 101 | 94 |
| Ref. | 107 | 91 | 49 | 34 |

It is evident from Table 3 that Polymer B of the present invention has substantially better mechanical properties compared to the Reference polymer, both initially (unaged) and after different times of ageing.

Telesingle wires were also made in accordance with Example 2 with Polymer B and the Reference polymer (Ref.) as the insulation layer. Thus, the telesingle wires had a solid 0.5 copper conductor surrounded by a 0.24 mm thick insulation of Polymer B and Ref., respectively. The mechanical properties tensile strength at break and elongation at break were measured initially (unaged) and after 2 months of ageing at 110° C. The OIT was measured initially (unaged) and after 6 months of ageing at 110° C. Immediately before measuring the properties the copper conductor was removed from the telesingle wires and the properties measured on the remaining insulation. The results are shown in Table 4.

TABLE 4

| | | |
|---|---|---|
| Tensile strength at break (MPa) | | |
| | Unaged | Aged 2 months |
| Polymer B | 32.9 | 31.7 |
| Ref. | 29.3 | 31.2 |
| Elongation break (%) | | |
| | Unaged | Aged 2 months |
| Polymer B | 925 | 1016 |
| Ref. | 808 | 983 |
| OIT (min) | | |
| | Unaged | Aged 6 months |
| Polymer B | 174 | 60 |
| Ref. | 108 | 38 |

It is evident from Table 4 that when used as a telesingle insulation Polymer B of the present invention has substantially better properties compared to the Reference polymer, both initially (unaged) and after ageing. As is seen from Table 4 compared to Table 3, the values of tensile strength at break and of elongation at break are increased for the Reference polymer when it is used as a telesingle insulation. This may be explained by the fact that when the polymer is used as a telesingle insulation it is oriented during the extrusion and this orientation of the polymer entails enhanced tensile strength at break and elongation at break.

What is claimed is:

1. An insulated communication cable, wherein the insulation comprises a multimodal olefin polymer mixture, obtained by polymerisation of at least one α-olefin in more than one stage, having a density of about 0.920–0.965 g/cm$^3$, a melt flow rate ($MFR_2$) of about 0.2–5 g/10 min, an $FRR_{21/2} \geqq 60$, and an environmental stress cracking resistance (ESCR) according to ASTM D 1693 A/10% Igepal, of at least 500 hours, said olefin polymer mixture comprising at least a first and a second olefin polymer, of which the first is selected from (a) a low molecular weight (MW) olefin polymer with a density of about 0.925–0.975 g/cm$^3$ and a melt flow rate ($MFR_2$) of about 300–20 000 g/10 min, and (b) a high molecular weight (MW) olefin polymer with a density of about 0.880–0.950 g/cm$^3$ and a melt flow rate ($MFR_{21}$) of about 0.5–20 g/10 min.

2. An insulated communication cable with insulation of said composition as claimed in claim 1, wherein the multimodal olefin polymer mixture has a density of about 0.925–0.955 g/cm$^3$, and an $MFR_2$ of about 0.5–2 g/10 min.

3. An insulated communication cable with insulation of said composition as claimed in claim 1, wherein the low MW olefin polymer has a density of about 0.935–0.975 g/cm$^3$ and an $MFR_2$ of about 300–2000 g/10 min.

4. An insulated communication cable with insulation of said composition as claimed in claim 1, wherein the high MW olefin polymer has a density of about 0.910–0.950 g/cm$^3$ and an $MFR_{21}$ of about 0.7–10 g/10 min.

5. An insulated communication cable with insulation of said composition as claimed in claim 1, wherein the olefin polymer mixture is a mixture of ethylene plastics.

6. An insulated communication cable with insulation of said composition as claimed in claim 5, wherein the composition has been obtained by coordination-catalysed polymerisation in at least two stages of ethylene and, in at least one stage, an α-olefin comonomer having 3–12 carbon atoms.

7. An insulated communication cable with insulation of said composition as claimed in claim 6, wherein the polymerisation stages have been carried out as slurry polymerisation, gas-phase polymerisation or a combination thereof.

8. An insulated communication cable with insulation of said composition as claimed in claim 7, wherein the slurry polymerisation has been carried out in a loop reactor.

9. An insulated communication cable with insulation of said composition as claimed in claim 8, wherein the polymerisation has been carried out in a loop-reactor/-gas-phase-reactor process in at least one loop reactor followed by at least one gas-phase reactor.

10. An insulated communication cable with insulation of said composition as claimed in claim 1, wherein the density of the low MW polymer is at most 0.05 g/cm$^3$ higher than that of the high MW polymer.

11. A telesingle wire comprising a conductor surrounded by an insulation, wherein the insulation comprises a multimodal olefin polymer mixture, obtained by polymerisation of at least one α-olefin in more than one stage, having a density of about 0.920–0.965 g/cm$^3$, a melt flow rate ($MFR_2$) of about 0.2–5 g/10 min, an $FRR_{21/2} \geqq 60$, and an environmental stress cracking resistance (ESCR) according to ASTM D 1693 A/10% Igepal, of at least 500 hours, said olefin polymer mixture comprising at least a first and a second olefin polymer, of which the first is selected from (a) a low molecular weight (MW) olefin polymer with a density of about 0.925–0.975 g/cm$^3$ and a melt flow rate ($MFR_2$) of about 300–20 000 g/10 min, and (b) a high molecular weight (MW) olefin polymer with a density of about 0.880–0.950 g/cm$^3$ and a melt flow rate ($MFR_{21}$) of about 0.5–20 g/10 min.

12. A telecommunication cable comprising a plurality of telesingle wires each comprising a conductor surrounded by an insulation, said plurality of telesingle wires in turn being surrounded by a sheath, wherein the insulation comprises a multimodal olefin polymer mixture, obtained by polymerisation of at least one α-olefin in more than one stage, having a density of about 0.920–0.965 g/cm$^3$, a melt flow rate ($MFR_2$) of about 0.2–5 g/10 min, an $FRR_{21/2} \geqq 60$, and an environmental stress cracking resistance (ESCR) according to ASTM D 1693 A/10% Igepal, of at least 500 hours, said olefin polymer mixture comprising at least a first and a second olefin polymer, of which the first is selected from (a) a low molecular weight (MW) olefin polymer with a density of about 0.925–0.975 g/cm$^3$ and a melt flow rate ($MFR_2$) of about 300–20 000 g/10 min, and (b) a high molecular weight (MW) olefin polymer with a density of about 0.880–0.950 g/cm$^3$ and a melt flow rate ($MFR_{21}$) of about 0.5–20 g/10 min.

13. Wherein said insulated communication cable in claim 1 is from the group consisting of a telesingle wire, a coaxial cable, and a telecommunication cable comprising of telesingle wires each comprising a conductor surrounded by an insulation, said plurality of telesingle wires being surrounded by a sheath.

* * * * *